June 23, 1931.  H. C. FORD  1,811,624
INTERMITTENT DRIVE
Filed Dec. 28, 1927   2 Sheets-Sheet 1
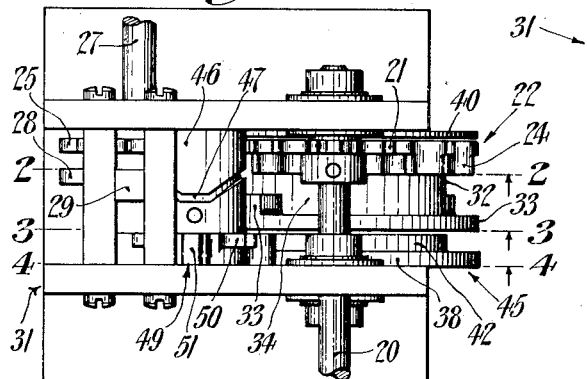
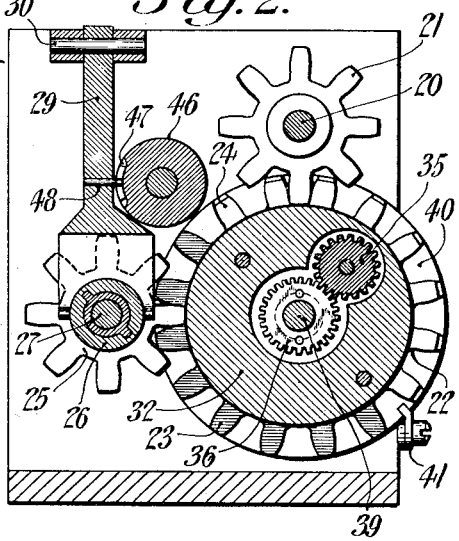
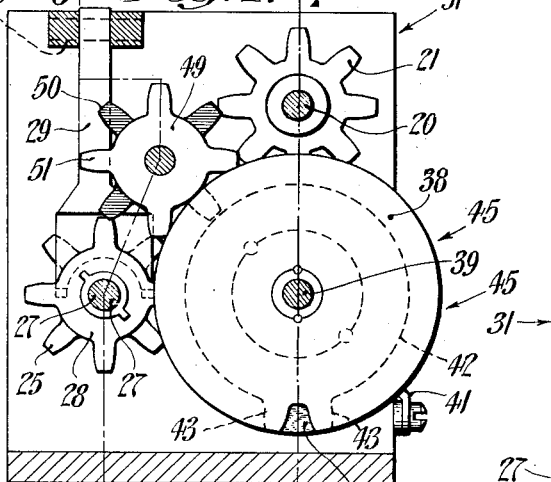
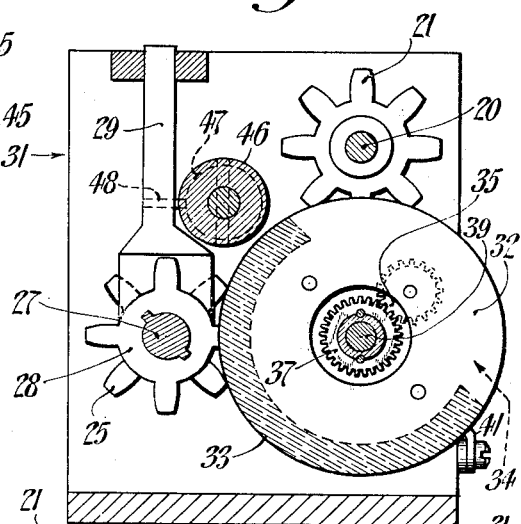
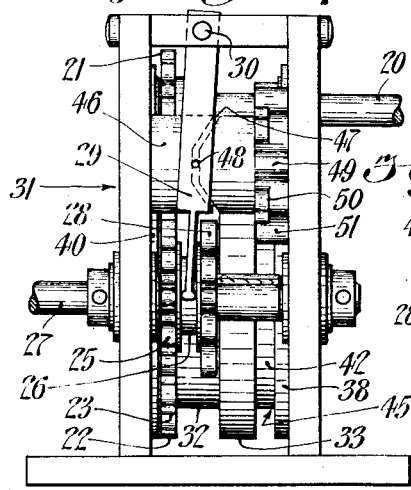
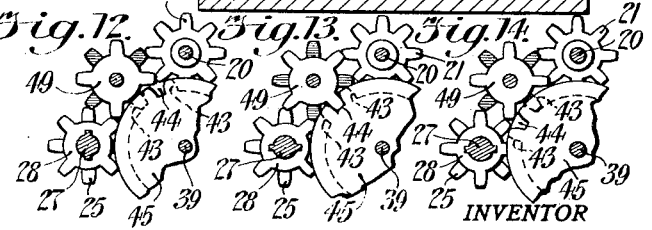
INVENTOR
Hannibal C. Ford
BY Moseley and Gill
ATTORNEYS

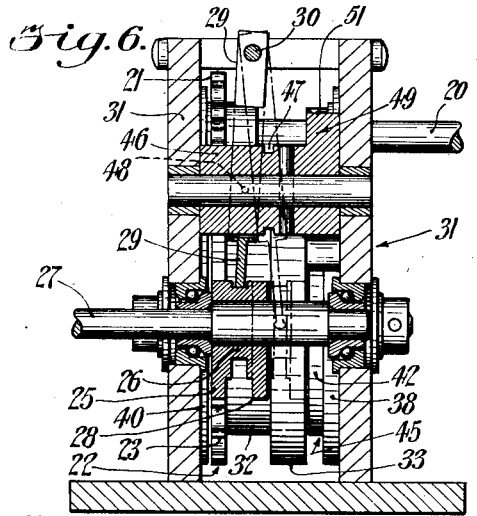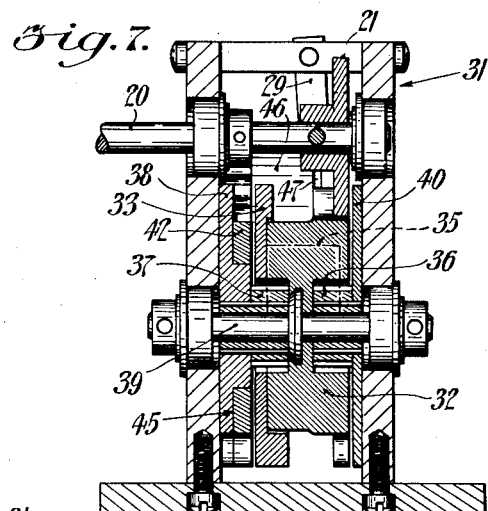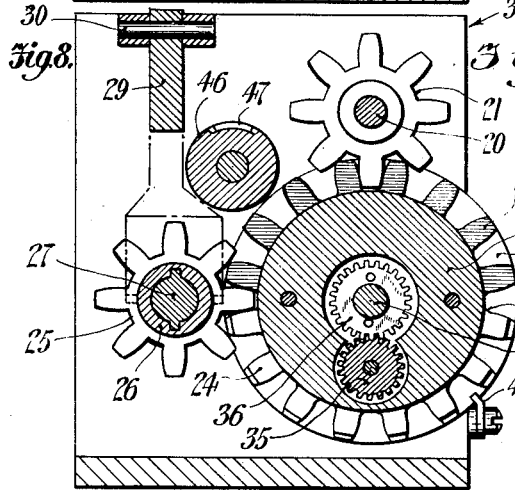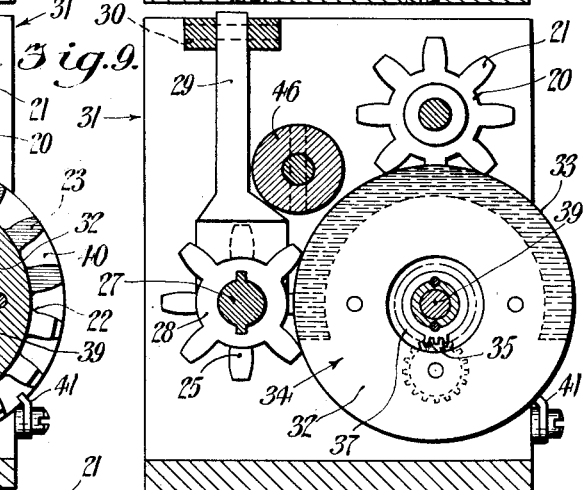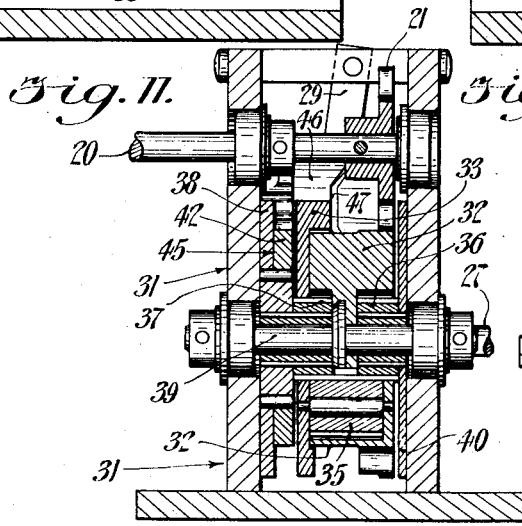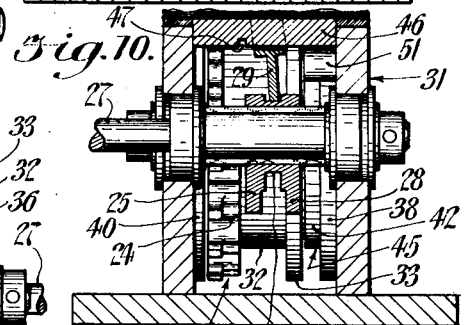

Patented June 23, 1931

1,811,624

UNITED STATES PATENT OFFICE

HANNIBAL C. FORD, OF JAMAICA, NEW YORK, ASSIGNOR TO FORD INSTRUMENT COMPANY, INC., OF LONG ISLAND CITY, NEW YORK, A CORPORATION OF NEW YORK

INTERMITTENT DRIVE

Application filed December 28, 1927. Serial No. 243,032.

This invention relates to intermittent drive means and has for its principal object the provision of novel and effective means for producing such results with certainty and uniformity.

Further objects of the invention relate to the provision of apparatus of relatively simple and inexpensive construction, adapted for the purpose specified; apparatus in which parts disconnected from the driving parts at certain stages of operation are held against rotation until another period of operation is reached; and means for assuring proper meshing and unmeshing of cooperating gears.

The particular nature of the invention together with other objects and advantages thereof will appear more clearly from a description of the apparatus shown in the accompanying drawings in which—

Fig. 1 is a top plan view of a preferred embodiment of the invention;

Fig. 2 is a view in section taken on the line 2—2 of Fig. 1;

Fig. 3 is a view in section taken along the line 3—3 of Fig. 1;

Fig. 4 is a view in section taken on the line 4—4 of Fig. 3;

Fig. 5 is a view in elevation as seen from the left of Fig. 1;

Fig. 6 is a view in section taken on the line 6—6 of Fig. 4;

Fig. 7 is a view in section taken on the line 7—7 of Fig. 4;

Fig. 8 is a view similar to Fig. 2 but with the parts in non-driving position;

Fig. 9 is a view similar to Fig. 3 but with the parts in non-driving position;

Fig. 10 is a sectional view corresponding to the lower part of Fig. 6 but with the parts in non-driving relation;

Fig. 11 is a view similar to Fig. 7 showing certain parts in non-driving relation and also showing speed reduction gearing; and Figs. 12, 13 and 14 are views on a reduced scale illustrating the control of the cam for establishing and breaking the driving train.

According to the illustrated embodiment of the invention, power from a suitable source is used to rotate a shaft 20 carrying thereon a pinion 21 which meshes with and drives a main driving gear 22 having a series of narrow teeth 23 and a series of broad teeth 24 providing with said narrow teeth a complete circular series of teeth in the plane of the teeth 23 and a series of teeth, formed by the extension of the wide teeth 24 beyond the narrow teeth 23, constituting a gear segment with teeth arranged around an arc of substantially 180°. It will be evident that this arrangement corresponds to a complete gear and an adjacent gear segment with its teeth in alignment with corresponding teeth on the complete gear. From the continuous circular series of teeth on the gear 22 motion is transmitted through an eight-toothed main driven gear 25 forming part of a member 26 having a driving connection with a shaft 27 but slidable along said shaft to make or break the connection between the gear 22 and the gear 25. The member 26 is also provided with a four-toothed main locking gear 28 separated from the gear 25 by a groove which receives the forked end of a shifter lever 29 mounted on a pivot 30 in the upper part of the frame 31 in which the various shafts are mounted.

The gear 22 forms part of a primary rotatable member or drum 32 which is provided at the side opposite the gear 22 with a disc 33 adapted to cooperate with the four-toothed gear 28 to lock the member 26 against rotation when shifted out of engagement with the teeth 23 and 24 on the drum 32. The disc 33 is cut away at its inner side to form a cut-out 34 along an arc of sufficient length and so positioned that when the member 26 is shifted to carry the gear 25 out of the plane of the complete gear 23 and into the plane of the gear segment 24, the teeth of the four-toothed gear 28 may be swung down into the cut-out and when the teeth of the gear 25 run off the end of the segment 24, the teeth of the gear 28 will cooperate with the cylindrical outer surface of the disc 33 and lock the member 26 against rotation. It will be evident that the gear segment 24 in connection with other features serves to assure smooth meshing and unmeshing of the gear 25 and the gear 22.

The shifter lever 29 is also operated from the drum 32 and to this end there is provided an elongated gear 35 journalled in the ends of the drum 32 and meshing at one end with a fixed gear 36 shown at the right in Fig. 11 and at the other end with a gear 37 having fixed thereto a secondary rotatable member or disc 38 and being carried on a shaft 39 which also carries the drum 32. Preferably the fixed gear 36 is attached to a disc 40 which is located just inside the adjacent side frame of the apparatus and is held against rotation by a member 41 secured to the frame and projecting into a notch in the disc. During operation of the drum 32, the elongated gear 35 is rolled around the fixed gear 36 and if the gear 36 had the same number of teeth there would be no driving effect on said gear 37 but by varying the number of teeth on the two gears 36 and 37, the gear 37 may be rotated. Let it be assumed that the gear 36 has 27 teeth and the gear 37 has 29 teeth. Then the gear 35 in rolling around the fixed gear 36 will cooperate with 27 of the 29 teeth of the gear 37 and will have advanced the gear 37 through a distance corresponding to two teeth. In this manner a relatively slow rotation is given to the disc or secondary member 38 which is provided at its inner face with a disc-like portion 42 having two teeth projecting to the peripheral surface of the main disc 38 which has a depression 44 registering with the gap between the teeth 43.

The member 45 including the disc portions 38 and 42 acts to effect an intermittent shifting of the shifter lever 29 by means including a cam drum 46 having a groove 47 to receive a pin 48 extending rearwardly from said shifter lever 29 and having at the end in the plane of the member 45 a gear 49, of the type commonly called a mutilated pinion, extending from the drum 46 and comprising a gear of even number of teeth with the parts of alternate teeth in the plane of the disc 38 removed. The complete part of gear 49 indicated as 50 constitutes a secondary driven member and the mutilated portion 51 constitutes a secondary locking gear. During the greater part of each rotation of the member 45, the gear 49 is held against rotation due to the engagement of two of the complete teeth with the disc 38 but when the member 45 rotates to a point where the notch 44 approaches the nearest complete tooth the first tooth 43 on the disc portion 42 will engage tooth of the part 50 extending down along the side of the disc 38 and will shift the gear 49 through a distance corresponding to two teeth while the tooth in the part 51 passes into and out of the notch 44 to a new locking position thus turning the drum 46, and due to the shape of the groove 47, shifting the shifter lever to a position to effect driving of the shaft 27 or to a position to release the shaft 27 from the driving connection.

While a preferred embodiment of the invention has been disclosed it will be understood that the invention may be embodied in other forms and that various changes may be made in its details without departing from the principle of the invention as defined in the appended claims.

I claim:

1. A transmission gearing comprising a reversible rotatable driving element and a driven element, said elements having relatively shiftable relation, shifting means operable to relate and irrelate said elements, and a control for said shifting means whereby the driven element passes successively between conditions of sustained rest and rotation.

2. A transmission gearing comprising relatively shiftable driving and driven elements, said driving element comprising a complete driving gear, a segmental driving gear, an annular lock segment and a lock annulus all in rigid combination, said driven element having rigidly combined gears of less and greater circular pitch, and means for relatively shifting the driving and driven elements whereby the gear of less circular pitch of said driven element passes out of mesh with the complete gear and into and out of engagement with said segmental driving gear of said driving element, and the gear of greater circular pitch of said driven element moves successively into engagement with the annular lock segment and lock annulus to lock said driven element, said shifting means being reversely operable to return the shifted parts to restore the driving relation between said driving and driven elements.

3. A transmission gearing comprising relatively shiftable driving and driven elements, said driving element comprising a complete driving gear, a segmental driving gear, an annular lock segment and a lock annulus all in rigid combination, said driven element having rigidly combined gears of less and greater circular pitch, and means for relatively shifting said elements during a single revolution of the driving element whereby the gears of the driving and driven elements are alternately engaged and disengaged at predetermined revolutions of the driving element and the gear of greater circular pitch of the driven element is engaged and disengaged with said lock segment and lock annulus as said gears are respectively disengaged and engaged.

4. In a transmission gearing, a driving element and a driven element, means for positively rotating the driven element from the driving element for a predetermined number of revolutions of the driving element at a fixed rotational relation to the driving element, means operable at the ends of said number of revolutions for releasing the driven element from the driving element, means for positively locking the driven element against rotation after release from the driving element for the same predetermined number of revolutions of the driving element and means for unlocking the driven element and positively and precisely reconnecting it to the driving element at the original rotational relation.

5. In an intermittent driving mechanism, a driving element, a driven element, and an intermediate element in uninterrupted engagement with each of said other elements, said intermediate element having means for rotating the driven element during a plurality of revolutions of the driving element and means operable at the end of said plurality of revolutions for locking the driven element against motion for a plurality of revolutions of the driving element.

6. In an intermittent driving mechanism, a driving member, a unitary two part driven member, and a unitary two part intermediate member one part of which is in permanent driving engagement with the driving member and is adapted to intermittently engage one part of the driven member to drive the driven member for a plurality of revolutions, the other part of the intermediate member being adapted to engage the other part of the driven member to lock the driven member against motion for a plurality of revolutions of the driving member when the first mentioned parts of these members are disengaged.

7. In an intermittent driving mechanism, a driving member, a unitary two part driven member, a unitary two part intermediate member one part of which is in permanent engagement with the driving member and is adapted to intermittently engage one part of the driven member to drive it, the other part of the intermediate member being adapted to engage the other part of the driven member to lock it against motion when the first mentioned parts of these members are disengaged, and means controlled by the driving member operative to engage the first mentioned parts and disengage the second mentioned parts of the driven member and the intermediate member to rotate the driven member for a predetermined number of revolutions and operative at the end of the last revolution of the predetermined member to disengage the first mentioned parts and engage the second mentioned parts of the driven member and intermediate member to lock the driven member against motion for a predetermined number of revolutions of the driving member.

8. In an intermittent driving mechanism, a driving member, a unitary two part shiftable driven member, a unitary two part intermediate member, one part permanently engaging the driving member and adapted to be engaged by one part of the driven member, the other part of the intermediate member being adapted to be engaged by the other part of the driven member to lock the driven member against motion when the first mentioned parts are disengaged, and means to shift the driven member into and out of the positions of engagement with the intermediate member.

9. In an intermittent driving mechanism, a driving member, a unitary two part shiftable driven member, a unitary two part intermediate member one part permanently engaging the driving member and adapted to be engaged by one part of the driven member, the other part of the intermediate member being adapted to be engaged by the other part of the driven member to lock the driven member against motion when the first mentioned parts are disengaged, and means controlled by the driving member to shift the driven member into and out of the positions of engagement with the intermediate member.

10. In an intermittent driving mechanism, a driving member, a unitary two part driven member, a unitary two part intermediate member one part of which is in permanent engagement with the driving member and is adapted to intermittently engage one part of the driven member to drive said member for a plurality of revolutions, the other part of the intermediate member being adapted to engage the other part of the driven member to lock it against motion for a plurality of revolutions of the driving member when the first mentioned parts are disengaged, said intermediate member being at all times in engagement with one or the other of the parts of the driven member whereby said driven member is incapable of independent movement and bears a fixed rotative relation to the driving member.

11. In an intermittent driving mechanism, a driving member, a unitary two part shiftable driven member, a unitary two part intermediate member one part of which is in permanent engagement with the driving member and is adapted to intermittently engage one part of the driven member to drive said member for a plurality of revolutions, the other part of the intermediate member being adapted to engage the other part of the driven member to lock it against motion for a plurality of revolutions of the driving member, and means controlled by the driving member to shift the driven member into and out of the positions of engagement with the intermediate member, said driven member being at all times in engagement with one or the other of the parts of the intermediate member whereby said driven member is incapable of independent movement and bears a fixed relation to the driving member under all conditions of operation of the driving member.

12. In an intermittent driving mechanism, a driving member, a unitary two part shiftable driven member, a unitary two part intermediate member one part of which is in permanent engagement with the driving member and is adapted to intermittently engage one part of the driven member to drive it for a plurality of revolutions, the other part of the intermediate member being adapted to engage the other part of the driven member to lock it against motion for a plurality of revolutions of the driving member, said driven member being at all times in engagement with one or the other of the parts of the intermediate member whereby said driven member is incapable of independent movement and bears a fixed rotative relation to the driving member, means to shift the driven member to engage one part thereof with the corresponding part of the intermediate member and at the same instant to disengage the other part of the driven member from the corresponding part of the intermediate member and means controlled by the driving member operatively connected to the shifting means for determining the duration of the rotation period and locking period of the driven member.

In testimony whereof I affix my signature.

HANNIBAL C. FORD.